Figure 1:
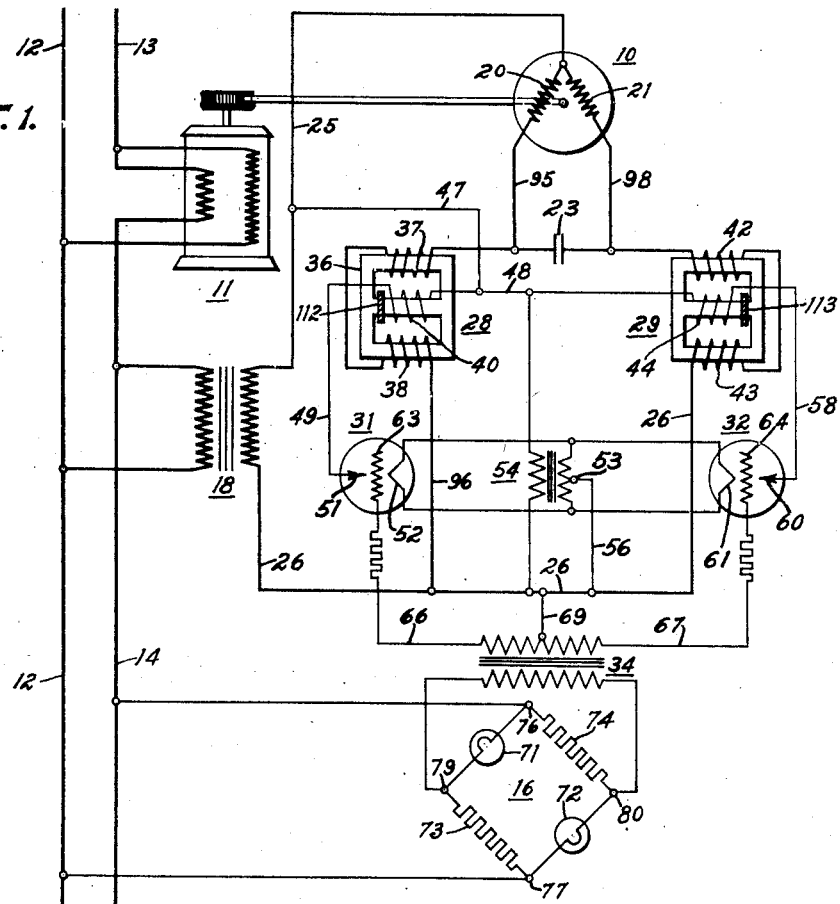

April 17, 1934.   M. J. BROWN   1,955,322
MOTOR CONTROL SCHEME
Filed April 12, 1932

WITNESSES:
R. S. Williams
C. F. Bryant

INVENTOR
Myron J. Brown
BY
Franklin E. Hardy
ATTORNEY

Patented Apr. 17, 1934

1,955,322

UNITED STATES PATENT OFFICE 1,955,322

MOTOR-CONTROL SCHEME

Myron J. Brown, Covington, Ky., assignor to Westinghouse Electric & Manufacturing Company, a corporation of Pennsylvania Application April 12, 1932, Serial No. 604,688

2 Claims. (Cl. 171—119)

My invention relates to control systems for electric motors and has particular relation to alternating-current motor control systems in which electronic tubes are employed for the purpose of controlling the motor-operating current.

In the past, the methods of controlling motors through the medium of grid-glow or other electronic tubes have required special tubes designed to directly carry the operating current of the motor, or, when such motor-current capacity tubes are not available, have necessitated the use of mechanical relays interposed between the motor and the tubes. Special tubes of the type described are unduly expensive and difficult to obtain, while the use of relays is subject to the disadvantage of introducing mechanically-movable-part devices into the control system.

My invention is directed to an improved motor-control system of the type referred to which overcomes the disadvantages above named and which possesses further advantages to be particularized hereinafter.

It is accordingly an object of my invention to provide a control system for alternating-current motors in which electronic tubes of commercially available capacity may be utilized to control relatively high values of motor-operating current without requiring the use of contact-making relays.

Another object of my invention is to provide a control system of the type described, which is particularly well suited for controlling reversible induction motors such as are utilized to effect the automatic operation of induction regulators.

A further object of my invention is to provide means for utilizing my improved control scheme as a part of an automatic voltage-regulating system for electrical circuits.

In practicing my invention I disposed intermediate the motor to be controlled and the source of alternating-current power, a saturable-core reactor provided with an exciting winding. The energization of this winding is controlled by an electronic tube which may be of any one of a number of types now known in the art and commercially available.

Normally, or when the reactor-exciting winding is deenergized, the reactor presents a high impedance to the flow of motor-energizing current and no operation of the motor can result. Energization of the exciting winding, which is effected, in the system of my invention, by impressing a control potential upon the grid element of the electronic tube, saturates the reactor core and reduces to a relatively low value the reactance in the motor-energizing circuit. This allows a current to flow to the motor which is of sufficient magnitude to effect its proper operation.

Figure 2:
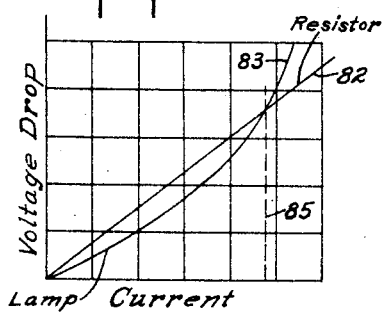
Figure 3:
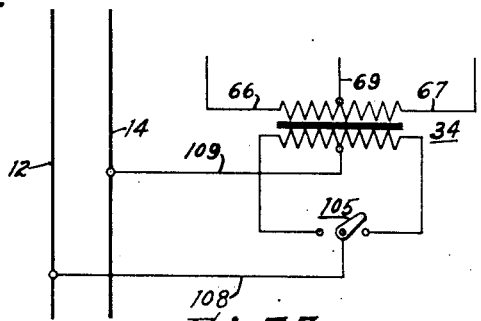

My invention, together with additional objects and advantages thereof, will best be understood through the following description of a specific embodiment when taken in conjunction with the accompanying drawing, in which:

Figure 1 is a diagrammatic representation of apparatus and circuits illustrating my invention applied to control an induction motor shown as comprising a part of an automatic-voltage regulating system, Fig. 2 is a diagram of curves illustrating a characteristic of the potential-sensitive bridge circuit which forms a part of the automatic regulating system of Fig. 1, and Fig. 3 is a diagrammatic view illustrating one manner in which the grid transformer of the system of Fig. 1 may be energized to adapt the system to manual instead of automatic control.

Referring to the drawing and particularly to Fig. 1 thereof, the control system of my invention is there illustrated as being applied to a single-phase induction motor 10 which is disposed to operate an induction regulator 11 which is associated with an alternating-current supply circuit comprising conductors 12 and 13 in a manner that the voltage supplied to consumption-circuit conductors 12 and 14 may be maintained constant or otherwise adjusted by the regulator. As illustrated, the voltage of regulated circuit 12—14 acts through a potential-sensitive bridge 16 to effect, through the control system of my invention, the operation of motor 10 required to cause regulator 11 to compensate for fluctuations in the voltage of supply circuit 12—13.

It will be understood, however, that the system of my invention is not restricted in its application to automatic voltage regulating systems as it will become evident that it may be applied to any situation in which it is desired to control an alternating-current motor through the medium of an electronic tube. Hence, the regulating system of Fig. 1 about to be described is to be considered illustrative of applications of the broad type just defined rather than as constituting the only situation in which the improved motor control system of my invention is applicable.

The motor 10 to be controlled is shown as being of a well known single-phase induction type, it comprising two separate windings 20 and 21 disposed upon a stator structure, the details of which are not shown, in a manner that simultaneous energization of the windings by alternating-current voltages which are displaced in phase, causes a rotating magnetic field to act upon the motor rotor (also not shown) with which the shaft is connected. In a motor of the type under consideration, the direction of rotation of this field may be changed by changing the relative phase relation of the winding energizing voltages.

In order that both windings may be energized from a common source of alternating-current power, it is customary to interconnect them through a phase-shifting device in a manner that when one of the windings is energized directly, the other will be energized through the device and thus be acted upon by a displaced voltage. In Fig. 1, such a device is shown in the form of a capacitor 23.

In the system of Fig. 1, energizing voltage for motor 10 may be derived from the alternating-current circuit 12—14 either directly, or, as shown, through a transformer 18, one end of the secondary winding of which is connected, through a conductor 25, to both windings of the motor while the other end is connected, through conductor 26, to the motor windings through reactor devices 28 and 29. When the motor 10 is energized through the circuit which includes reactor 28, it is caused to rotate in a forward direction while when it is energized through the circuit which includes reactor 29, it rotates in the reverse direction. Such a change in rotative direction results from the presence of phase-shifting capacitor 23 intermediate the motor windings, the action of which capacitor has already been explained.

Selection of the particular circuit through which the motor will be energized is effected through the medium of electronic tubes 31 and 32 which are illustrated as being of a well known grid-controlled gas-filled variety. As shown in Fig. 1, control potential for tubes 31 and 32 is supplied thereto through a transformer 34.

Reactors 28 and 29 may be of any suitable saturable-core variety and are illustrated as being of a well known three-leg core type. Thus, in the case of reactor 28, the two outer legs of core structure 36 carry windings 37 and 38 which are connected directly in the "forward" motor-energizing circuit while the middle leg of the core carries an exciting winding 40, the energization of which is controlled by electronic tube 31. Similarly, the reactor 29 is provided with a core member having two outer legs which carry windings 42 and 43 connected directly in the "reverse" motor-energizing circuit, and a central leg which carries an exciting winding 44, the energization of which is controlled by tube 32.

Normally, or when the reactor exciting windings are deenergized, the reactors present a relatively high impedance to the flow of current through their outer windings so that the value of current which is permitted to flow in the motor energizing circuits is extremely small and insufficient to cause operation of the motor. When, however, the exciting winding of one of the reactors is energized by a suitable direct current a magnetic saturation of the reactor core structure results. This reduces the effective reactance of the windings on the outer legs to a relatively low value, and by thus lowering the impedance of the associated motor-energizing circuit, allows the circuit to pass a sufficient current to cause operation of the motor.

Electronic tubes 31 and 32 act, in the system of Fig. 1, not only as current-controlling devices but also as rectifiers, this latter characteristic permitting the reactor-exciting windings to be energized from an alternating-current source of power. Thus, the energizing circuit for the exciting winding 40 of reactor 28 will be seen to extend from energizing conductor 25 through conductors 47 and 48, the winding 40, conductor 49, anode and cathode elements 51 and 52 of tube 31, the secondary winding of a tube cathode-heating transformer 54 having a tap-connection 53, and conductor 56 back to energizing conductor 26.

Similarly, the exciting winding 44 of reactor 29 is energized by a circuit which extends from conductor 25 through conductors 47 and 48, the winding 44, conductor 58, anode and cathode elements 60 and 61 of tube 32, the secondary winding of transformer 54 and conductor 56 back to energizing conductor 26.

Tubes 31 and 32 permit current to pass in one direction only, from the anode to the cathode element, so that when disposed in the manner shown in Fig. 1, the reactor exciting windings can receive energizing current only during that half of the alternating-current voltage cycle in which conductor 25 is positive with respect to conductor 26. The reactor exciting windings are thus subjected to a pulstating direct current, the magnitude of which is determined by a control potential impressed upon the grid elements 63 and 64 of the tubes.

This grid potential, as will be understood may be supplied in any suitable manner. In the system illustrated, it is provided through the medium of transformer 34, the two ends of the secondary winding of which are respectively connected, through conductors 66 and 67, with the grid elements 63 and 64 of tubes 31 and 32, and the middle point of which is connected, through conductors 69, 26 and 56, and transformer 54, with the cathode elements 52 and 61 of the tubes.

The primary winding of transformer 34 is, in the automatic voltage regulating system illustrated, energized from a well-known type of non-ohmic bridge circuit 16, which circuit will be seen to comprise a pair of metallic-filament lamps 71 and 72, and a pair of resistors 73 and 74 associated therewith in the manner shown. Upon two opposite or diagonal points 76 and 77 of the bridge circuit is impressed the voltage of circuit 12—14 to be regulated, while to the remaining two element juncture connections 79 and 80 in the bridge circuit, the primary winding of transformer 34 is connected.

The manner in which bridge circuit 16 functions is illustrated by the curves of Fig. 2. It will be observed that the voltage to be regulated acts to send a current through lamp 71 and resistor 73 in series, and also through resistor 74 and lamp 72 in series. The current flow through each of these circuits changes in magnitude in accordance with changes in the voltage impressed between points 76 and 77. While the voltage drop through each resistor bears a straight line relation to the current flow therethrough, as is indicated by curve 82 of Fig. 2, no such straight line relation obtains for the lamps, the relation applying to each of them being of the general order indicated by curve 83 of Fig. 2.

It will be recognized that curve 83 is concave upwardly for the reason that as the lamp current is increased, the filament temperature is raised and by virtue of the positive temperature coefficient of resistance possessed by the filament material, the resistance of the lamp and consequently the voltage drop increases at a greater rate than does the current.

At some particular value of current flow through the two current paths comprised by bridge circuit 16, there will be no potential difference between points 79 and 80 of the circuit. Such a value of current is designated in Fig. 2 at 85 and will be understood to correspond to a given value of voltage impressed between points 76 and 77 of the circuit, which voltage in the system of Fig. 1 is that of circuit 12—14 to be regulated. For all other values of voltage impressed upon the bridge circuit, there will be a potential difference between points 79 and 80, which difference will depend in magnitude and phase position upon the deviation of bridge current from the balanced value 85.

In Fig. 2 a measure of the potential appearing between points 79 and 80 of the bridge circuit is given by the amount of opening between curves 82 and 83. Consequently, assuming that the desired voltage of circuit 12—14 results in a balanced condition of non-ohmic bridge circuit 16, a decrease in voltage will cause transformer 34 to be energized by a voltage which is in phase with that acting in circuit 12—14, while an increase above the desired value, corresponding to the value of current 85 in Fig. 2 will cause transformer 34 to be energized by a voltage which has a 180° phase relation with respect to that of circuit 12—14.

By virtue of the mid-tap connection 69 of transformer 34, when the transformer is subjected to the in-phase, energizing voltage grid element 63 of electronic tube 31 will be acted upon by a potential which is of opposite phase to the anode voltage of the tubes, while when transformer 34 is energized by a potential of opposite phase, electronic tube 32 will similarly be acted upon by a grid potential which is in phase with the anode voltage of the tubes. It will be apparent, therefore, that, in the connection shown in Fig. 1, when the grid potential impressed upon one of the tubes is in phase with the tube anode voltage, the potential impressed upon the grid of the other tube is 180° out of phase with the anode voltage.

Tubes 31 and 32 illustrated in the system of Fig. 1 are, as has been mentioned, shown as being of a well known grid-controlled gas-filled type, which, however, is not the only type which may be utilized in the system of invention, as will be more completely pointed out. For the particular grid-circuit connections illustrated, the tubes should have a positive break-down characteristic, such as obtains when they are filled with neon gas.

When the grid element of such a tube is maintained at zero potential with respect to the cathode element, no current conduction from anode to cathode can take place. However, when during the positive half cycle of anode voltage, the grid element is maintained at a positive potential with respect to the cathode, the tube is rendered conductive. Consequently, when there is no voltage impressed upon transformer 34, neither of tubes 31 or 32 conducts current and the motor 10 to be controlled remains unenergized.

It has been pointed out that a decrease below a desired value in the voltage impressed upon bridge circuit 16 so energizes transformer 34 as to make grid element 63 of tube 31 positive with respect to cathode element 52 during the positive half cycle of anode voltage, and that similarly an increase above the same desired value of voltage impressed upon bridge 16 energizes transformer 34 in a manner to make grid element 64 of tube 32 positive with respect to cathode element 61.

When rendered conductive tube 31 effects, in the manner already explained, the saturation of reactor 28 and so lowers its impedance that it passes an operating current from the secondary winding of transformer 18 through a circuit which extends from conductor 25 through winding 20 of motor 10, conductor 95, the windings 37 and 38 of reactor 28, and conductor 96 back to conductor 26. Winding 21 of motor 10 is simultaneously energized through a circuit which extends from conductor 25, through the winding, conductor 98 and capacitor 23 to the windings of reactor 28.

By virtue of the phase displacement introduced by capacitor 23 into the energizing current of winding 21 a rotating field is set up in the motor structure which causes the motor to start in the forward direction, as has been pointed out. Motor 10 is coupled with regulator 11 in a manner that such forward rotation operates the regulator in the voltage-raising direction.

Similarly, when tube 32 becomes conductive, reactor 29 is saturated and motor 10 is thus caused to be energized through a circuit which extends from conductor 25, through winding 21 of the motor, conductor 98, and the windings 42 and 43 of reactor 29 back to conductor 26. At the same time motor winding 20 also is energized through a circuit which extends from conductor 25, the winding 20, and conductor 95 through capacitor 23 to the windings of reactor 29.

For this last-named condition of winding energization, motor 10 is caused to start up in a reverse direction and to operate regulator 11 in the voltage-lowering direction.

In operation of the complete voltage-regulating system shown in Fig. 1, when voltage of regulated circuit 12—14 is of the desired value, bridge 16 is balanced so that neither of the electronic tubes 31 or 32 is conductive, and motor 10 is thereby maintained de-energized. A decrease in the voltage of the regulated circuit unbalances bridge 16 in a manner that transformer 34 impresses, during the positive half cycle of tube anode voltage, a positive potential upon grid element 63 of tube 31 and a negative potential upon element 64 of tube 32.

Tube 31 is thereby rendered conductive, and, in energizing exciting winding 40 of reactor 28, so lowers the reactance of windings 37 and 38 that the forward operating circuit of motor 10 is energized. Motor 10 accordingly operates regulator 11 in the voltage-raising direction to effect an appropriate correction of the regulated-circuit voltage.

In a similar manner an increase in the voltage of regulated circuit 12—14 unbalances bridge 16 in the opposite direction thereby causing transformer 34 to impress, during the positive half cycle of tube anode voltage, a positive potential upon grid element 64 of tube 32 and a negative potential upon element 63 of tube 31. Tube 32 is accordingly rendered conductive and energizes exciting winding 44 of reactor 29. This action so lowers the reactance of windings 42 and 43 of the reactor that they pass a current sufficient to operate motor 10 in the reverse direction. Motor 10 thus operates regulator 11 in the voltage-lowering direction to effect suitable correction of the regulated-circuit voltage.

As has been pointed out, the tube-reactor combination of control circuit for an alternating-current motor is not restricted to automatic voltage-regulating systems of the type shown in Fig. 1, or to automatic systems of other types, since it is readily adaptable to manual control also. In Fig. 3, I have illustrated a modification in the energizing means for grid transformer 34 of the system of Fig. 1 whereby the operation of a two-position switch 105 causes the transformer to effect the same changes in tube-grid potentials as do changes above and below a balanced value in the voltage impressed upon bridge circuit 16 which the switch replaces. Transformer 34 and the switch are connected with regulated-circuit conductors 12 and 14 by means of conductors 108 and 109, respectively.

In the modification depicted in Fig. 3, closure of switch 105 to the left energizes the left half of the primary winding of the transformer 34 causing the secondary winding of the transformer to impress a positive grid potential upon tube 31 and a negative potential upon tube 32. Closure of the switch to the right energizes the right hand end of the transformer primary winding and thus reverses the polarity of voltage acting in the secondary winding of the transformer. As a result, tube 32 receives a positive grid potential while the tube 31 receives a negative potential. This reversal of polarity will be seen to result from the fact that the middle point of the transformer primary winding is permanently connected, through conductor 109, with conductor 14 of the regulated circuit, while one or the other of the two ends of this winding may be selectively energized, through the operation of switch 105, by connection to conductor 108 which joins with regulated-circuit conductor 12.

The operation of the remaining portions of the control system is exactly similar to that already described in connection with the automatic control operation so that no further description of it is deemed necessary.

If desired, the rate of change of magnetic flux in the reactor core members may be limited to practically any value desired through the use of a damping element placed around the middle core leg of the reactor. Such elements, which are shown on Fig. 1 at 112 and 113, for reactors 28 and 29, respectively, may be found useful in protecting the insulation of the reactor windings from excessively high voltage which otherwise might be induced were the flux allowed to die down, for example, almost instantaneously upon the controlling tube being rendered non-conductive. One effect of such damping means is, of course, to slow down the speed of response of the control system. However, it will be appreciated that by properly designing the insulation of the reactors such means may be eliminated and a very high speed of response thereby obtained.

Although in the specific control circuit combination for electronic tubes 31 and 32 illustrated, it is required that the tubes have positive breakdown characteristics to operate properly, it will be appreciated that the system of my invention may also utilize tubes having negative breakdown characteristics by properly modifying the grid control circuits such as by the insertion of suitable potential sources, such as auxiliary transformers, or by the combination of other means well known in the art.

Likewise, while the motor to be controlled is illustrated as of the single-phase induction type having a pair of positionally displaced windings which are interconnected through a capacitor, it will be appreciated that polyphase induction motors as well as other types of alternating-current motors may also be controlled in accordance with the teachings of my invention. Thus, for example, any alternating-current motor which is provided with a forward and a reverse operating circuit, or which is disposed to operate in one direction only, may readily have its operating current controlled by means of saturable-core reactors acted upon by electronic tubes whose control grids are influenced in any manner desired.

Hence, while I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination with an induction motor having two separate windings, a phase-shifting device associated with the windings, a source of alternating-current power for the motor, an operating circuit, including the first of said motor windings directly and the second of said windings in series with said device, disposed to effect, when energized, forward rotation of the motor, a second operating circuit, including the second of said motor windings directly and the first in series with the said device, disposed to similarly effect, when energized, reverse rotation of the motor, a saturable-core reactor disposed intermediate the power source and each of said motor-operating circuits to control the energization thereof, an exciting winding associated with each reactor to control the reactance thereof, an energizing circuit for each of said exciting windings, an electronic tube disposed in each of said energizing circuits, and means for selectively influencing each of said tubes by a control potential.

2. In a system comprising an alternating-current circuit, an induction regulator for the circuit, a single-phase alternating-current motor, having two separate windings, coupled to operate the regulator, a source of power for the motor, a phase-shifting device associated with the motor windings, a "forward-rotation" motor-operating circuit including the first of said motor windings directly and the second in series with the phase-shifting device, a "reverse-rotation" motor-operating circuit including the second of said motor windings directly and the first in series with the phase-shifting device, a saturable-core reactor disposed intermediate the power source and each of said motor-operating circuits to control the energization thereof, an exciting winding associated with each reactor to control the reactance thereof, an energizing circuit for each of said exciting windings, an electronic tube disposed in each of said energizing circuits, and means for selectively influencing each of said tubes by a control potential determined by a characteristic of the said circuit to be regulated.

MYRON J. BROWN.